Sept. 11, 1973     W. W. SCHILLING     3,758,365

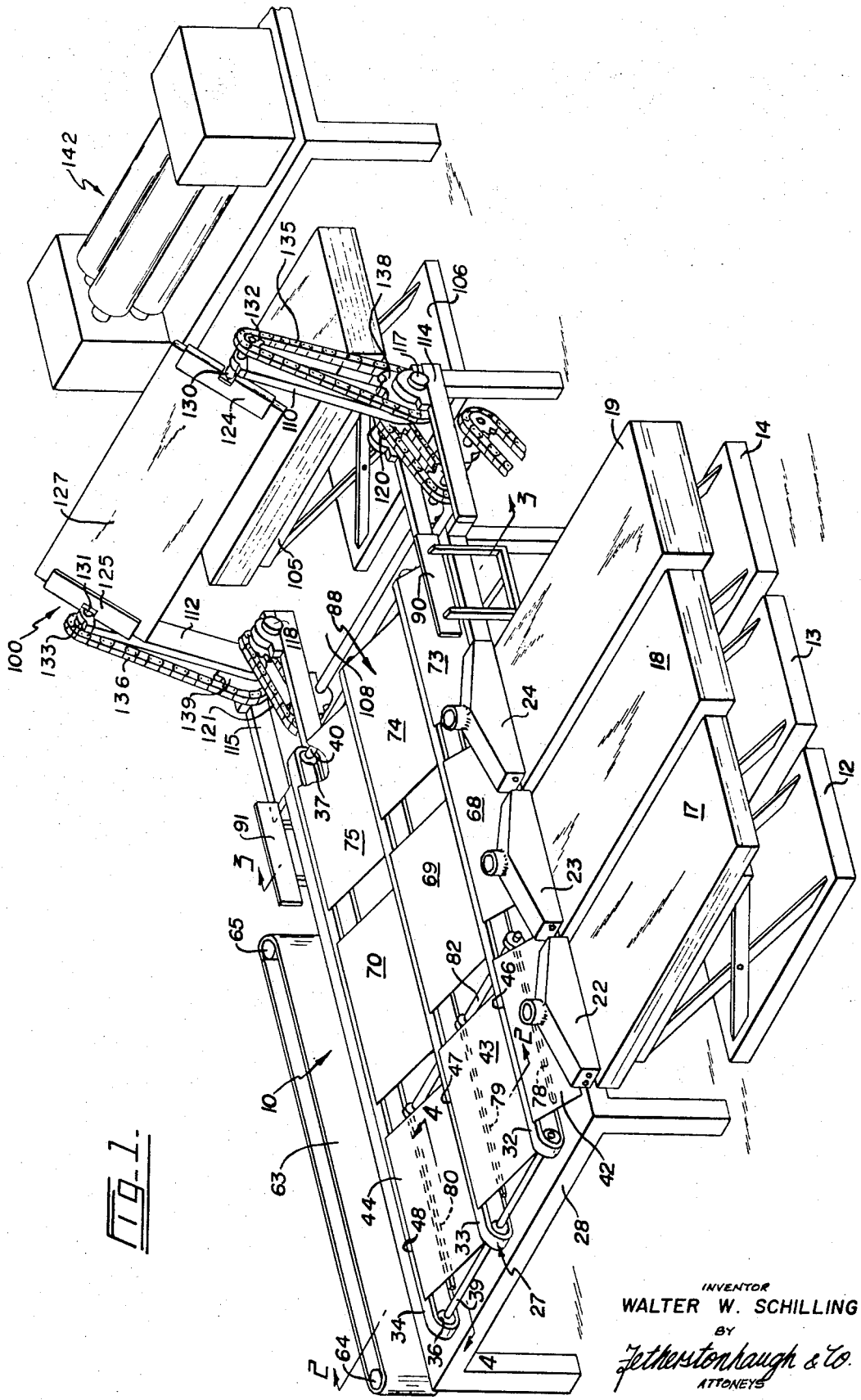

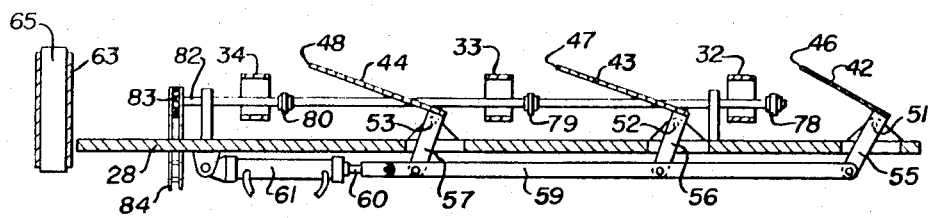

SHEET FEEDING APPARATUS

Original Filed March 21, 1969     3 Sheets-Sheet 3

INVENTOR
WALTER W. SCHILLING
BY
Fetherstonhaugh & Co.
ATTORNEYS

United States Patent Office 3,758,365
Patented Sept. 11, 1973

3,758,365
SHEET FEEDING APPARATUS
Walter W. Schilling, Ladner, British Columbia, Canada, assignor to MacMillan Bloedel Limited, Vancouver, British Columbia, Canada
Original application Mar. 21, 1969, Ser. No. 809,295, now Patent No. 3,617,054. Divided and this application June 10, 1971, Ser. No. 151,733
Int. Cl. B32b 31/10, 31/12
U.S. Cl. 156—538                13 Claims

ABSTRACT OF THE DISCLOSURE

Apparatus for feeding sheets or veneers from stacks thereof and located side-by-side to a station either singly or in superimposed pairs. At the station there is apparatus for gripping the sheets or veneers along opposite edges thereof and substantially throughout the length of said edges, and swinging these over a lay-up table where they are released.

---

Figure 6:
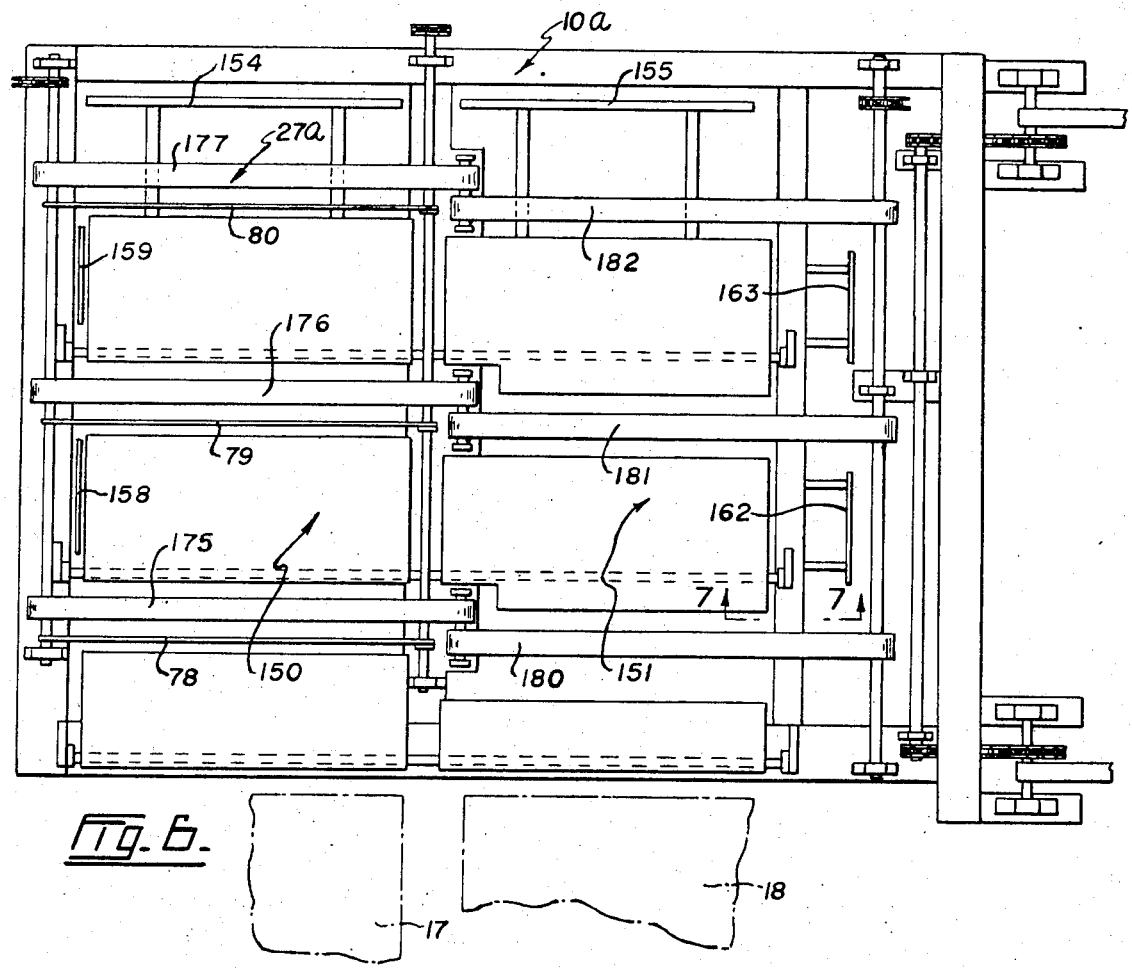

This application is a division of application Ser. No. 809,295 filed Mar. 21, 1969, now U.S. Pat. No. 3,617,054.

This invention relates to apparatus for feeding sheets to be laid up in multi-sheet panels, and particularly panels having face and back sheets, said face and back sheets having good or outer surfaces to form the outer surfaces of the panels.

Although this apparatus may be used for laying-up of sheets of any type of material, it is particularly designed for feeding and laying-up wood sheets or veneers during the manufacture of plywood, and for the sake of convenience it will be so described herein.

The outer sheets of plywood panels are commonly known as faces and backs, or face sheets and back sheets. The grain of the face and back sheets usually runs longitudinally of the panel, and each panel has at least one cross-banding or core layer, either in a single piece or sheet, or in two or more pieces positioned side by side. The grain of the cross-banding layer usually extends across the panel. A 3-ply panel includes face and back sheets and one core sheet. In 5-ply construction, there is a centre sheet, a cross-banding or core layer on each face thereof, and the back and face sheets. If a panel having more plies is required, additional centre sheets and core layers are added.

In most plants manufacturing plywood today, the face and back sheets, centre sheets if required, and core sheets, single or multiple pieces, are laid up by hand. For example, one way of doing this is to lay a back sheet or veneer on a table, placing a core or cross-banding layer, in a single piece or multiple pieces, with glue applied to opposite faces thereof, on top of the back layer, and then placing the face sheet or veneer thereon for a 3-ply construction. If a panel of more than 3 plies is to be made, a centre or veneer sheet is laid on the first core layer, and then a second core layer with glue applied thereto is laid on the centre veneer, followed by a face veneer on the second core layer. The laid-up layers or sheets are then placed in a hot press in order to complete the formation of a plywood panel.

The flow of materials to the lay-up station is generally from two directions. The lay-up man stands directly in front of and facing a long side of the lay-up table. Core or cross-banding pieces or sheets are fed on to the lay-up table by a glue applicator which is located on the other side of the lay-up table. When a face or a back or a centre sheet is required, two persons grip the desired sheet with their hands, one at each end, and carry it forward and deposit it on top of the stack of veneers resting on the lay-up table. As the sheet is being carried forward, it must be raised to clear the lay-up operator to avoid striking him. In practice, the lay-up operator will generally bend down while the sheet being carried is raised sufficiently to clear him. This is an unsatisfactory procedure in that there is always the danger of physical injury to the lay-up operator, and the lifting and bending actions are physically tiring. Furthermore, the sheet ends can be easily split or otherwise damaged by the stresses imposed thereon when they are lifted by hand. A further disadvantage resides in the fact that the speed of the lay-up operation is largely dependent upon the speed at which the face, back and veneer sheets are carried forward. Not only is this a tiring operation to the persons involved, but it is a waste of manpower to have two strong men standing ready to lift a veneer which has so little weight compared to its area. This manual procedure is relatively slow, inefficient and inconvenient.

The reason the veneers are directed over the head of the operator on to the table is that way has to be left at one end of the table for the removal of the stacked veneers, and this leaves only one end of the table for the feeding of the face and back veneers, and the centre veneers when required. The face, back and centre veneers are usually made from different stock or grades of wood, and may even have different thicknesses.

Apparatus according to the present invention feeds face and back sheets or veneers mechanically and automatically to the lay-up station in a path which permits the lay-up operator to work in an erect and natural position at all times. If desired, the apparatus may be used to feed centre veneers as well. It eliminates the need for the two men which previously lifted the sheet over the head of the operator onto the lay-up station. Furthermore, this apparatus grips each sheet or veneer throughout substantially the entire length of each end thereof, thereby eliminating physical damage to the sheets, and particularly the poor or weaker grades of veneer, it turns over the sheets or veneers to remove debris or foreign materials therefrom, and it can be used in the lay-up of 3-, 5- and 7-ply panels without any mechanical alteration or modification.

Apparatus in accordance with this invention comprises a support, conveyor means on the support for moving sheets to a receiving station, feed means for directing first sheets and second sheets side by side on to said conveyor means, and a sheet handler at the conveyor and operable to superimpose the first sheet on to the second sheet, said conveyor means being operable to deliver the superimposed sheets to said receiving station.

Figure 7:
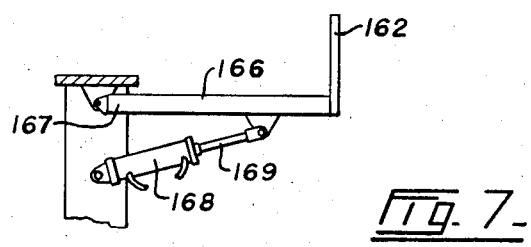

An example of this sheet feeding apparatus is illustrated in the accompanying drawings, in which FIG. 1 is a diagrammatic perspective view of one form of sheet delivery apparatus in accordance with the present invention, FIG. 2 is a cross-section taken on the line 2—2 of FIG. 1, FIG. 3 is a cross-section taken on the line 3—3 of FIG. 1, FIG. 4 is a longitudinal section taken on the line 4—4 of FIG. 1, FIG. 5 is a plan view of one side of the sheet transporting unit and its grippers which form part of this apparatus, FIG. 6 is a plan view of parts of an alternative apparatus in accordance with this invention, and FIG. 7 is a section taken on the line 7—7 of FIG. 6.

Referring to the drawings, sheet feeding apparatus 10 is set up so that it can be used to lay up face sheets and back sheets with or without centre sheets. Apparatus 10 can be used to feed the sheets to a station for any desired purpose, but it is preferably used to direct sheets singly or in superimposed condition to a sheet transporting unit.

The face, back and centre sheets are selectively fed to apparatus 10 in any convenient manner. In this example, scissor hoists 12, 13 and 14 have stacks of veneer face, back and centre sheets 17, 18 and 19 positioned thereon, respectively. These are well known self-levelling hoists. Vacuum feeders 22, 23 and 24 are positioned above hoists 12, 13 and 14, respectively, and are adapted to lift sheets off the stacks on the hoists one at a time and to move them longitudinally over a suitable conveyor 27 mounted on and extending longitudinally of a support or frame 28. This conveyor extends across the ends of the three hoists. As the vacuum feeders are known and do not form part of this invention, they do not need detailed description herein. Each feeder is such that a suction element is moved downwardly on to the upper surface of the uppermost sheet of a stack, and suction draws that sheet against powered rollers. The suction unit is raised, and the rollers are driven so as to cause the sheet to move longitudinally thereof on to conveyor 27.

Although conveyor 27 may be any suitable type, it is preferably in the form of a plurality of laterally-spaced belts, and in this example, there are three belts 32, 33 and 34. These belts extend around pulleys 36 and 37 at their opposite ends which are mounted on shafts 39 and 40, respectively. One of these shafts is driven by suitable source of power, not shown.

Depressible shear plates 42, 43 and 44 are respectively mounted between feeder 22 and belt 32, belts 32 and 33, and belts 33 and 34, and are aligned with hoist 12. When these plates are in their uppermost positions, they are inclined so that their respective upper edges 46, 47 and 48 are a little above the level of belts 32, 33 and 34. When these shear plates are depressed, their edges 46, 47 and 48 are below the level of the three conveyor belts.

These shear plates are moved between their upper and lower positions in any desired manner. One way of doing this is illustrated in FIG. 2. Plates 42, 43 and 44 are swingably mounted at lower edges thereof on shafts 51, 52 and 53, and connectors 55, 56 and 57 are secured to the plate and extend downwardly below the shafts. The connectors are connected at the lower ends thereof to a common bar 59, and one end thereof is pivotally connected to the piston rod 60 of a suitably-mounted fluid-operated cylinder 61.

With this arrangement, when vacuum feeder 22 is operated, it directs the forward edge of a face veneer or sheet 17 on to and over inclined shear plates 42, 43 and 44, and these direct the veneer or sheet over conveyor belts 32, 33 and 34. The thrust of the rollers of vacuum feeder 22 drives the sheet against a guide belt 63 extending along the side of support 28 remote from hoist 12. This guide belt extends around rollers 64 and 65 at opposite ends thereof. The thrust of the feed rollers is sufficient to cause the sheet to clear plate 42, and when the three shear plates are depressed by the operation of cylinder 61, the sheet rests on conveyor belts 32, 33 and 34.

Shear plates 68, 69, and 70 are provided in line with hoist 13. while shear plates 73, 74 and 75 are provided in line with hoist 14. The shear plates 68, 69, 70 and 73, 74, 75 are similar to plates 42, 43 and 44, and are operated in the same manner.

Sheet turner arms 78, 79 and 80 are each fixedly mounted on a common shaft 82 which extends across support 28 in line with hoist 12 and near shear plates 42, 43 and 44. Arms 78, 79 and 80 normally lie in a substantially horizontal plane below the upper surfaces of conveyor belts 32, 33 and 34, see FIGS. 2 and 4, but when shaft 82, is rotated by suitable power means, these arms swing upwardly to lift the face sheet 17 resting on the conveyor belts up and over on to a back sheet 18 positioned on said belts. Shaft 82 may be rotated in any suitable manner, such as by means of a sprocket 83 fixedly mounted thereon, and connected by chain 84 to a suitable power source, not shown. The turner arms swing through an arc of approximately 180°. After this action, the arms are returned to their normal horizontal positions.

In apparatus 10, conveyor belts 32, 33 and 34 are long enough to extend past shear plates 73, 74 and 75 into a receiving station or pick-up position 88 where they act as a holder or support for panels to be shifted on to the lay-up table. It will be understood, however, that these belts may be shortened, in which case the area in line with the centre sheet stack becomes the receiving station or pick-up position.

Squaring bars 90 and 91 are located at opposite sides of the pick-up position 88. These bars have a normal vertical position, as shown in FIG. 1, and preferably are shiftable out of this position in any convenient manner. FIG. 3 shows pivotally mounted arms 93 and 94 connected to and extending downwardly from bars 90 and 91, and the lower ends of these arms are respectively connected to the pistons of fluid-operated cylinders 96 and 97. These cylinders normally hold bars 90 and 91 in their vertical positions, and when the cylinders are operated, they swing the bars away from each other and out of their normal positions.

The apparatus described so far is a desired form of conveyor system which is used to direct veneers or sheets to the transporting unit, generally designated by the numeral 100. Although the apparatus can be used to deliver face sheets and back sheets alone to the transporting unit, it is preferably used to convey one of the sheets superimposed upon the other to the unit. For example, a face sheet 17 and a back sheet 18 are simultaneously shifted on to the belts of conveyor 27 in the manner described above. After the shear plates have been depressed, turner arms 78, 79 and 80 are operated to turn face sheet 17 over on top of back sheet 18. As this action takes place, the wind pressure against sheet 17 maintains it firmly against the turner arms until the latter stop moving, and the sheet drops down comparatively gently on to sheet 18 because of the air cushion therebetween. Then conveyor 27 is operated to shift the superimposed sheets into the pick-up station 88 where they are ready for the transporting unit 100.

If a centre sheet 19 is required, it is shifted out on to the belts of conveyor 27, and the latter is operated to shift this sheet into pick-up position 88.

Transporting unit 100 moves the sheets from position 88 to a lay-up table 105. This table may be in any desired form, but in this example, it is illustrated as part of a scissors hoist 106. Table 105 is spaced outwardly from the adjacent end of conveyor 27 or pick-up position 88 to leave a space or station 108 for the machine operator.

Transporting unit 100 can take any desired form, but a desirable unit is illustrated in FIG. 1. As the illustrated unit does not form part of this invention, a complete description is not rquired herein.

Transporting unit 100 includes a pair of spaced arms 110 and 112 positioned at opposite sides of the operator's station 108. These arms are mounted on suitable supports 114 and 115 which, in this example are extensions of support 28 on the opposite sides of space 108. Arms 110 and 112 are fixedly mounted at one end thereof on shafts 117 and 118 located on a common axis and journalled in suitable bearings on supports 114 and 115. These arms are rotated by suitable drives 120 and 121 which rotate the shafts 117 and 118, respectively.

Arms 110 and 112 have grippers 124 and 125 mounted for rotation on their outer ends. These grippers are such that they can be opened to receive the ends of a sheet or sheets 127 located in the pick-up position 88, closed to grip the sheet or sheets, and then opened again to deposit them on table 105. These grippers are made long enough so that they extend substantially the length of the ends of each sheet gripped thereby.

It is preferable to rotate grippers 124 and 125 through 360° while arms 110 and 112 are swung through approximately 180°. This is accomplished by mounting grippers 124 and 125 on stub shafts 130 and 131 carried by the outer ends of arms 110 and 112, small sprockets 132 and 133 fixedly mounted on the shafts, chains 135 and 136 trained around said sprockets and around larger sprockets 138 and 139 mounted on shafts 117 and 118 but held against rotation in any suitable manner. The ratio of the larger sprockets to the smaller sprockets will depend upon the relative levels of position 88 and table 105, but an illustrative ratio is about 3 to 1.

A standard glue spreader 142 is positioned on the opposite side of table 105 from the operator's station 108. A part only of this spreader is shown in FIG. 1, but as it is a standard glue spreader and well known, it does not require complete illustration and description herein.

The operation of apparatus 100 is relatively simple. Starting with a pair of superimposed face and back sheets 17 and 18 located in pick-up position 88 after having been properly centered therein by squaring bars 90 and 91, arms 110 and 112 of transporting unit 100 are swung towards the pick-up position with grippers 124 and 125 open. The grippers are then closed to grip the ends of the sheets. The transporting arms are swung upwardly and over through approximately 180° to position the sheet over lay-up table 105. As this action takes place, chains 135 and 136 cause the grippers and the sheets gripped thereby to rotate through 360°. This places the sheets over the lay-up table and the grippers are opened to drop the sheets thereon.

FIGS. 6 and 7 illustrate an alternate form of sheet feeding apparatus. In these figures, apparatus 10a includes a conveyor 27a which is made in two sections 150 and 151. Section 150 is located opposite the stack of face veneers 17, while the section 151 is located opposite the stack of veneers 18. The apparatus for a stack of centre veneers 19 has been omitted. When sheets are directed into sections 150 and 151, they are moved against stop bars 154 and 155 which are at the side of the conveyor opposite the sheet stacks. These bars 154 and 155 can be swung out of the way in the same manner as bars 90 and 91, described above. Permanent stop bars 158 and 159 are located at one end of conveyor 27a so that face sheets directed into section 150 extend parallel to these bars. Similarly, depressible stop bars 162 and 163 are provided at the opposite end of the conveyor so that a back sheet directed into section 151 extends parallel to these bars when it engages stop 155. Bars 162 and 163 can be depressed in any suitable manner. FIG. 7 shows bar 162 mounted on the outer end of and projecting outwardly from an arm 166 which is pivotally mounted at its inner end 167. A fluid-operated cylinder 168 has a piston rod 169 connected to arm 166. When cylinder 168 is actuated to retract rod 169, bar 162 is drawn downwardly below the level of conveyor 27a.

Apparatus 27a includes the sheet turner arms 78, 79 and 80.

Conveyor 27a is made up of belts 175, 176 and 177 in section 150, and belts 180, 181 and 182 in section 151. The belts of the two sections are moved independently of each other so that they can be moved in opposite directions or in the same direction, as desired.

When a face sheet 17 is positioned in conveyor section 150, and a back sheet 18 is positioned in conveyor section 151, stop bars 154 and 155 stop the sheets in their correct positions transversely of the apparatus. After bars 154 and 155 have been retracted, conveyor belts 175, 176, 177 and 180, 181, 182 are moved to shift the sheets away from each other so that the face sheet is moved against stops 158 and 159, and the back sheet against stops 162 and 163. This positions the edges of the two sheets at the opposite ends of conveyor 27a in their proper positions so that when the face sheet is swung over on top of the back sheet, the leading edges of the two sheets are aligned with each other. It will be noted that the section 151 of the conveyor also acts as the pick-up position of the apparatus.

The over-all operation of the sheet feeding apparatus is apparent from the preceding descripiton. The apparatus is started with a face veneer 17 with its good surface down on lay-up table 105. Then spreader 142 is operated to eject a core or cross-banding layer, either in a single piece or multiple pieces, on to the veneer on the table. The core pieces have glue on opposite faces thereof. While this is taking place, a face veneer has been turned over on top of a back veneer on the conveyor 27a. The good surface of the back veneer is uppermost at this time. Then the superimposed veneers or sheets, after being gripped along the opposite ends thereof by grippers 124 and 125, are transported over on to the table. The sheets make one complete revolution during this time so that the back sheet rests on the core layer, with the face sheet uppermost. This action is continued until a desired number of sheets or veneers are stacked on the lay-up table, and they are then removed and taken to the press.

This action results in the production of 3-ply plywood panels. If five or more plies are required, centre sheets can be fed in from the centre feed stack in FIG. 1 in proper order to be placed on cross-banding layers on the table. If the apparatus of FIG. 6 is used, the centre sheets will be placed in the stack on the lay-up table by other means.

I claim:

1. Sheet feeding apparatus comprising a support, a conveyor on the support in the form of a plurality of laterally spaced conveyor belts for moving veneer sheets to a receiving station, feed means for directing first sheets and second sheets on to the conveyor side by side, a plurality of laterally spaced turner arms swingably mounted between the belts and normally located below the oposition of the first sheet on the belts, said arms being swingable between the normal location thereof and a location above the position of the second sheet to turn said first sheet over on to said second sheet, and power means operatively connected to said arms to swing the arms at sufficient speed to cause wind pressure to maintain the first sheet firmly against the moving arms until said first sheet drops on to the second sheet, a pocket of air between said sheets at this time causing the first sheet to drop comparatively gently on to the second sheet, and said conveyor being operable to deliver the superimposed sheets to said receiving station.

2. Sheet feeding apparatus as claimed in claim 1 including means at the receiving station to position the sheets thereon in a predetermined position.

3. Sheet feeding apparatus as claimed in claim 1 including means for shifting said superimposed sheets on to a lay-up table, and glue applicator means for delivering core layers with glue on opposite faces thereof to the lay-up table, said shifting means being operable to deliver superimposed sheets on to the core layers on the table.

4. Sheet feeding apparatus as claimed in claim 1 including means for positioning each sheet on the conveying conveyor before the first sheet is turned over on the second sheet and to cause at least one edge of the sheets to be aligned when said sheets are superimposed.

5. Sheet feeding apparatus as claimed in claim 1 including means for selectively directing centre sheets on to said conveyor.

6. Sheet feeding apparatus as claimed in claim 1 including first and second scissors hoists beside the conveyor upon which first and second sheets are respectively stacked, and first and second vacuum feeders at the first and second hoists operable to transfer sheets from the respective hoists on to the conveyor.

7. Sheet feeding apparatus as claimed in claim 6 including a third scissors hoist beside the conveyor upon which centre sheets are stacked, and a third vacuum feeder at the third hoist operable to transfer centre sheets on to the conveyor.

8. Sheet feeding apparatus as claimed in claim 1 including sheer plates between said conveyor belts normally below the level of the belts and raisable to inclined positions with upper edges above the belt level, and means for moving said plates between the normal positions and inclined positions thereof, said sheer plates when raised being inclined with their upper edges extending away from said feed means.

9. Sheet feeding apparatus as claimed in claim 8 including a vertically disposed guide belt extending along said conveyor belts on the side thereof remote from said feed means.

10. Sheet feeding apparatus as claimed in claim 1 including a vertically disposed guide belt extending along said conveyor on the side thereof remote from said feed means.

11. Sheet feeding apparatus as claimed in claim 1 in which said turner arms are normally in horizontal positions between the conveyor belts below the level thereof and are swingable to substantially horizontal positions above the level of the belts.

12. Sheet feeding apparatus as claimed in claim 1 in which said conveyor includes a first set of belts at the position of the first sheets and a second set of belts at the position of the second sheets, first power means for selectively moving the first set of belts in the directions towards and away from the receiving station, second power means for moving the second set of belts in the direction towards the receiving station, first stop means positioned to be engaged by the first sheets when the first set of belts are moved in the direction away from the receiving station, and second stop means positioned to be engaged by the second sheet when the second set of belts are moved in the direction towards the receiving station.

13. Sheet feeding apparatus as claimed in claim 12 including means for moving said second stop means so as to permit the superimposed sheets to be moved to the receiving station when the first and second sets of belts are moved in the direction of said receiving station.

References Cited
UNITED STATES PATENTS

| | | | |
|---|---|---|---|
| 2,847,109 | 8/1958 | Gauthier et al. | 198—35 |
| 3,034,632 | 5/1962 | Wampler | 198—33 AD |
| 3,289,811 | 12/1966 | Kelley | 198—35 |
| 3,367,823 | 2/1968 | Clausen et al. | 156—557 X |
| 2,940,613 | 6/1960 | Prentice et al. | 214—1 S |
| 3,616,090 | 10/1971 | Larson | 156—566 X |
| 2,815,866 | 12/1957 | Watter | 214—147 T |

EDWARD G. WHITBY, Primary Examiner

U.S. Cl. X.R.

156—566; 198—35; 214—1 R, 1 F, 1 S, 1 Q, 147 T; 271—9, 69